(12) United States Patent
Chang

(10) Patent No.: US 9,665,963 B1
(45) Date of Patent: May 30, 2017

(54) DYNAMIC COLLAGE LAYOUT GENERATION

(71) Applicant: Google Inc., Mountain View, CA (US)

(72) Inventor: Jason Chang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 11 days.

(21) Appl. No.: 14/924,570

(22) Filed: Oct. 27, 2015

(51) Int. Cl.
    *G06K 9/00*     (2006.01)
    *G06T 11/60*     (2006.01)
    *G06T 5/40*     (2006.01)
    *G06T 7/00*     (2017.01)
    *G06K 9/62*     (2006.01)

(52) U.S. Cl.
CPC ............ *G06T 11/60* (2013.01); *G06K 9/6202* (2013.01); *G06T 5/40* (2013.01); *G06T 7/0042* (2013.01)

(58) Field of Classification Search
None
See application file for complete search history.

(56) References Cited

U.S. PATENT DOCUMENTS

| | | | | |
|---|---|---|---|---|
| 6,097,389 | A * | 8/2000 | Morris | G06F 3/0483 715/804 |
| 7,576,755 | B2 * | 8/2009 | Sun | G06T 11/60 345/629 |
| 7,656,543 | B2 * | 2/2010 | Atkins | H04N 1/00132 358/1.13 |
| 8,161,377 | B2 * | 4/2012 | Atkins | G06T 11/60 715/243 |
| 8,891,883 | B2 * | 11/2014 | Murphy-Chutorian | G06K 9/00221 382/118 |
| 9,311,530 | B1 * | 4/2016 | Murphy-Chutorian | G06K 9/00221 |
| 9,361,720 | B2 * | 6/2016 | Tang | G06T 11/60 |
| 2004/0177316 | A1 * | 9/2004 | Layzell | G06T 11/60 715/246 |
| 2014/0233811 | A1 * | 8/2014 | Murphy-Chutorian | G06K 9/6267 382/118 |
| 2015/0189107 | A1 * | 7/2015 | Murata | G06T 11/60 345/629 |

OTHER PUBLICATIONS

Atkins, "Adaptive photo collection page layout," Proc. ICIP, 2004, pp. 2897-2900.*
Atkins, "Blocked recursive image composition," Proc. ACM MM, Oct. 26-31, 2008, pp. 821-824.*

(Continued)

*Primary Examiner* — Feng Niu
(74) *Attorney, Agent, or Firm* — Patent Law Works LLP

(57) ABSTRACT

A system for dynamic collage layout generation comprises a processor and a memory storing instructions that, when executed, cause the system to: receive a plurality of pictures to arrange into a collage, calculate pairwise distances between the plurality of pictures, arrange the plurality of pictures into one or more groups based on the pairwise distances between the plurality of pictures, calculate a group arrangement cost based on an aspect ratio of the one or more groups, determine an arrangement of the one or more groups based on the group arrangement cost, and place the pictures in a collage layout based on the arrangement of the one or more groups. The disclosure also includes similar methods and computer program products.

30 Claims, 6 Drawing Sheets

(56) References Cited

OTHER PUBLICATIONS

Fan, "Photo Layout with a Fast Evaluation Method and Genetic Algorithm," in 2012 IEEE International Conference on Multimedia and Expo Workshops, 2012, pp. 308-313.*

Wu et al., "PicWall: Photo collage on-the-fly", Signal and Information Processing Association Annual Summit and Conference (APSIPA) 2013 Asia-Pacific, pp. 1-10, 2013.*

Kustanowitz et al., "Hierarchical layouts for photo libraries," IEEE Multimedia, vol. 13, No. 4, 2006, pp. 62-72.*

Li et al., "An aesthetic solution for photo collection page layout," in Knowledge and Systems Engineering, 2009. KSE'09. International Conference on. IEEE, 2009, pp. 33-38.*

\* cited by examiner

DYNAMIC COLLAGE LAYOUT GENERATION

BACKGROUND

Computer applications are sometimes used to combine images from separate sources into a single composition for use in a variety of endeavors such as internet browsing, mobile computing, film, video games, television, simulators, and art. Computer applications can transform still images or video and may do so in 2D and 3D environment.

A variety of online applications including social networks and others often allow users to upload or add photos, videos, or other images. Transforming photographs into interesting media content has increased with the advent of social media. Photographic portraits of users may be placed into fixed photo layouts and used to pictorially represent a group of users.

SUMMARY

According to one innovative aspect of the subject matter described in this disclosure, a system comprising: one or more processors; and a memory storing instructions that, when executed, cause the system to receive a plurality of pictures to arrange into a collage, calculate pairwise distances between the plurality of pictures, arrange the plurality of pictures into one or more groups based on the pairwise distances between the plurality of pictures, calculate a group arrangement cost based on an aspect ratio of the one or more groups, determine an arrangement of the one or more groups based on the group arrangement cost, and place the pictures in a collage layout based on arrangement of the groups and arrangement of the pictures in the groups.

In general, another innovative aspect of the subject matter described in this disclosure may be embodied in methods that include: receiving a plurality of pictures to arrange into a collage, calculating pairwise distances between the plurality of pictures, arranging the plurality of pictures into one or more groups based on the pairwise distances between the plurality of pictures, calculating a group arrangement cost based on an aspect ratio of the one or more groups, determining an arrangement of the one or more groups based on the group arrangement cost, and placing the pictures in a collage layout based on the arrangement of the one or more groups.

Other implementations of one or more of these aspects include corresponding systems, apparatus, and computer programs, configured to perform the actions of the methods, encoded on computer storage devices.

These and other implementations may each optionally include one or more of the following features. For instance, the features may include: calculating the pairwise distances between the plurality of pictures; calculating histograms from the plurality of pictures; applying a Gaussian blur to the histograms to form blurred histograms; and calculating Euclidean distances between the blurred histograms. For instance, the features may include: calculating the pairwise distances between the plurality of pictures; determining a first perimeter for a first picture and a second perimeter for a second picture; calculating a perimeter difference between the first perimeter and the second perimeter; determining a first area for a first picture and a second area for a second picture; calculating an area difference between the first area and the second area; and combining the perimeter difference and the area difference to form a pairwise distance between the first picture and the second picture. For instance, the features may include: arranging the plurality of pictures into one or more groups includes arranging the plurality of pictures into three groups; the group arrangement cost is also based on a picture size similarity; and stretching the collage layout to match a specified collage aspect ratio. For instance, the features may include selecting the specified collage aspect ratio from example aspect ratios of approximately 1:1, 2:1, 4:3, 3:2, 16:9, 3:1, and the like. For instance, the operations may further include automatically determining the specified collage aspect ratio based an output format for the collage; cropping one or more pictures of the plurality of pictures to fit into the collage layout; and cropping the one or more pictures is based on recognized details in the one or more pictures and further comprises performing detail recognition on the one or more pictures prior to cropping the one or more pictures, the detail recognition including at least one of tagged details recognition and gradient detail recognition.

These implementations are particularly advantageous in a number of respects. For instance, the collage layout may be unique, interesting, and customized to the inputted pictures. Additionally, the system and method automatically vary the layout based on the pictures without other user input. In contrast, multiple collage layouts may be provided from which the user may select the preferred. Moreover, the technology may lower the chances that relevant portions of a picture end up being cropped out in order to fit the picture into the collage layout. The technology also makes it easy to change the aspect ratio of the collage. Further, similar looking pictures may be automatically clustered together in the collage thereby relieving the user of having to manually arrange pictures in a preset collage layout.

It should be understood, however, that the above features and advantages are not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

A collage is a set of pictures combined together to form an assemblage. In some instances, pictures in a collage may or may not be rotated, overlapped, etc. Laying out multiple pictures into a collage with a computer application is generally performed through fixed template layouts. For example, in generating a 9 picture collage, the user may be prompted to select from a half-dozen templates in which to place his pictures. As disclosed herein, collage layouts may be dynamically generated based on the input pictures, as opposed to using templates.

In performing this collage layout generation, the outputted picture collage may perform less cropping of the input pictures. Moreover, the collage layout may be generated with an aspect ratio in mind, and other aesthetic factors may be taken into consideration in arranging the resulting collage so that it may be more visually pleasing.

The inputted pictures may be placed into groups using a greedy strategy. The groups may then be combined by calculating a combined grouping with a low calculated cost. A few non-limiting exemplary factors that may be considered include picture size, aspect ratio, picture similarity and the like. The collage layout may be stretched and the pictures may be cropped to appropriately fit within the collage layout.

Accordingly, systems, methods and interfaces for generating collage layouts are disclosed. While the systems, methods and interfaces of the present disclosure are now described in the context of a client-server system, it should be understood that the systems, methods, and interfaces can be applied to systems other than a client-server system operably connected over a network where generation of a collage layout is performed on a single server. For example, a client device, third party servers, social network servers, or media sharing servers may provide some or all of the functionality described herein and may employ a cluster of servers in order to provide such functionality. As additional examples, client hardware may be a mobile phone or tablet device.

Figure 1:
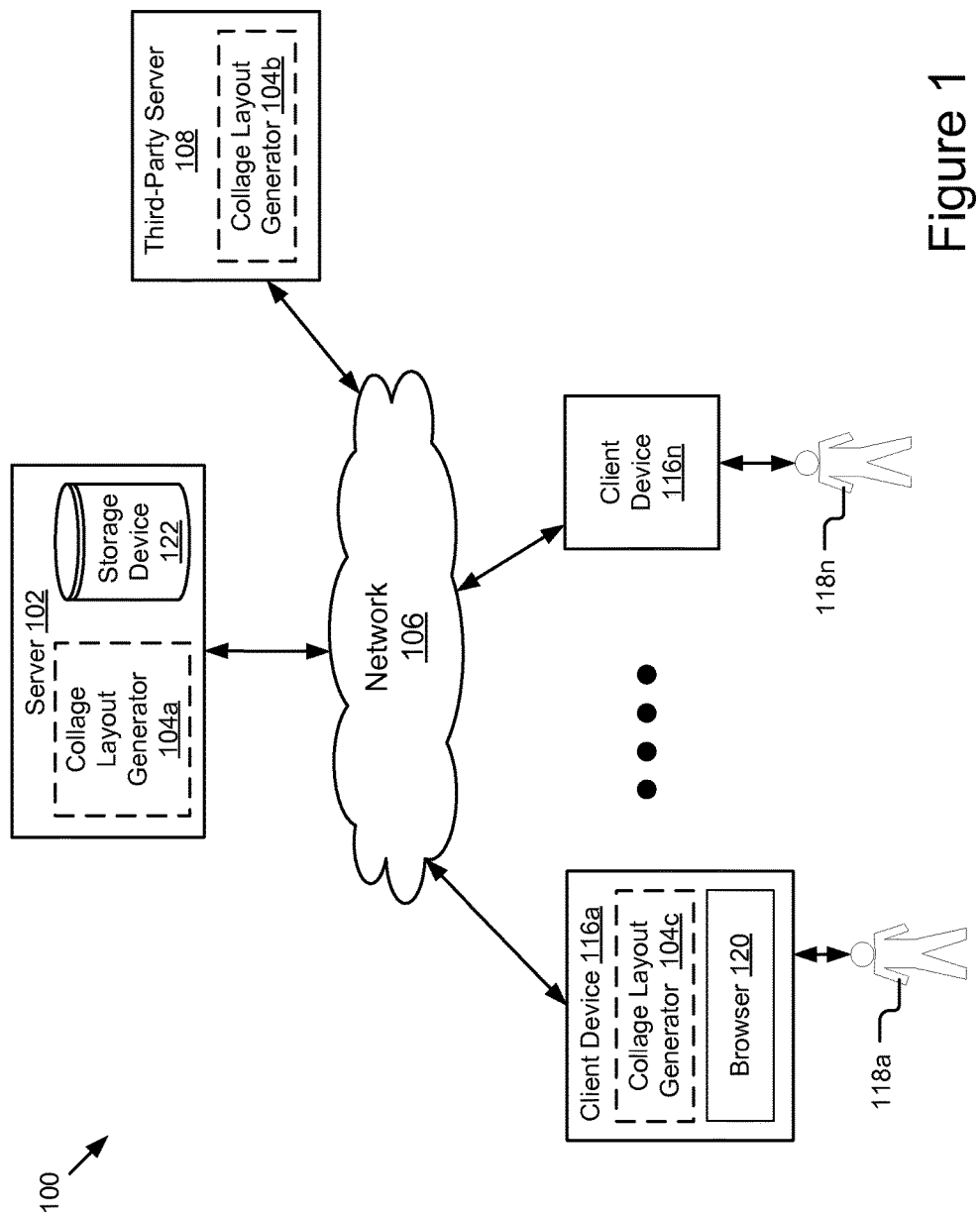
FIG. 1 is a high-level block diagram illustrating an example system including a collage layout generator.

FIG. 1 is a high-level block diagram illustrating an example system 100 including a collage layout generator 104. The illustrated system 100 includes client devices 116a-116n (also referred to herein individually and collectively as 116) that are accessed by users 118a-118n (also referred to herein individually and collectively as 118), a server 102 having a collage layout generator 104a.

The client devices 116a-116n in FIG. 1 are used by way of example. While FIG. 1 illustrates two client devices 116a and 116n, the present disclosure applies to any system architecture having one or more client devices 116. Furthermore, while only one network 106 is coupled to the client devices 116a-116n, and the server 102, in practice one or more networks 106 can be connected to these entities.

While shown as operational on the server 102 in FIG. 1, in some implementations all or part of the collage layout generator 104 may be operational on the one or more of the client devices 116, server 102 or other servers. For instance, a collage layout generator 104a may be located on, and operational from, the server 102, while another collage layout generator 104b may be located on, and operational from, a third-party server 108, while yet another collage layout generator 104c may be located on, and operational from, client devices. The collage layout generator 104 is also coupled for communication with the client device 116a, which is connected to the network 106. The user 118a interacts with the client device 116a. Similarly, the client device 116n is coupled to the network 106 and the user 118n interacts with the client device 116n. The user 118 is a human user of the client device 116. It should be recognized that the components of the collage layout generator 104 can be stored on and operational on any combination of the devices and servers, or in only one of the devices or servers.

Figure 2:
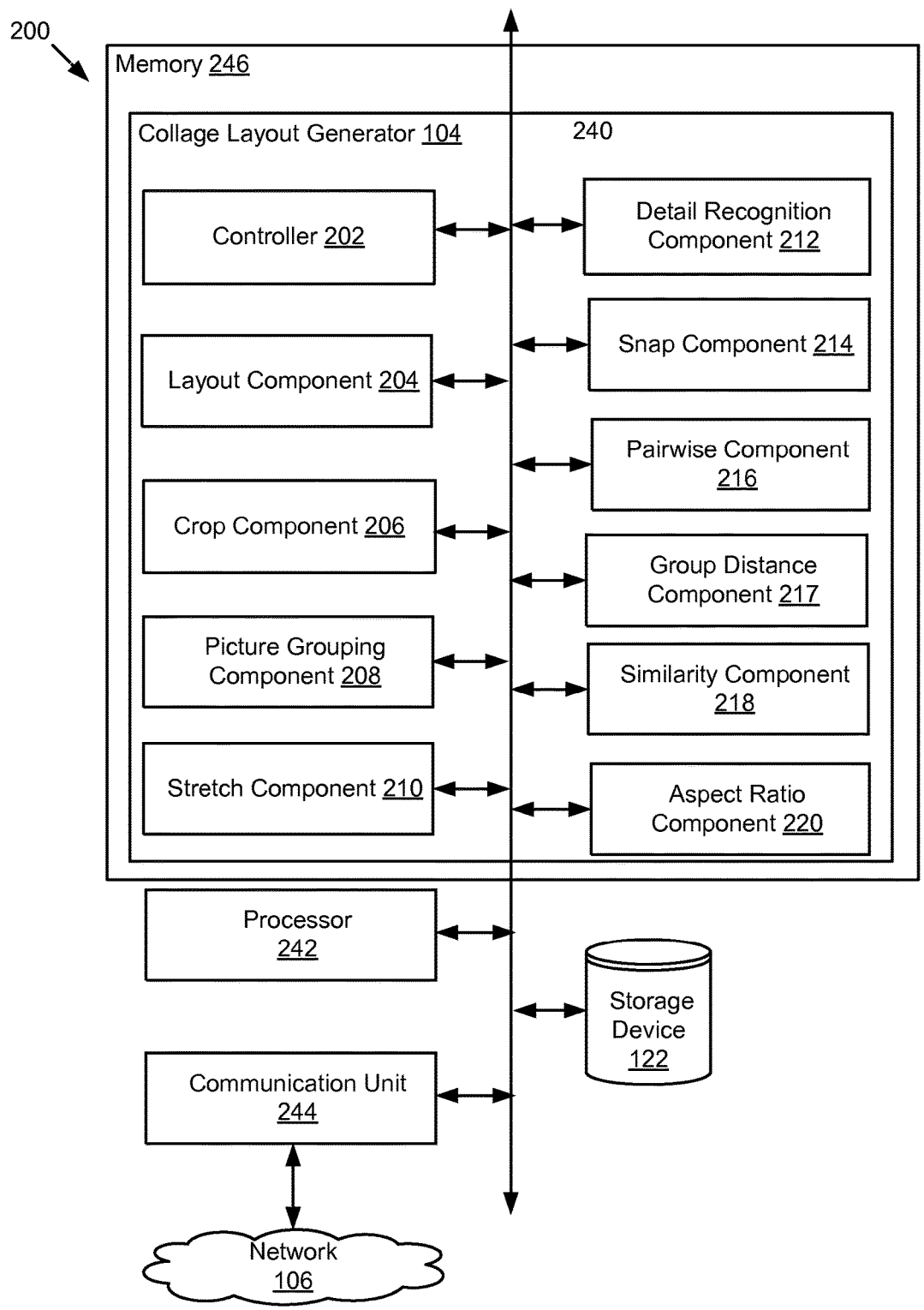
FIG. 2 is a block diagram illustrating an example collage layout generator.

The collage layout generator 104 will be describe in more detail with reference to FIG. 2 and the remaining figures.

The client devices 116 can be any computing device including one or more memory devices and one or more processors, for example, a laptop computer, a desktop computer, a tablet computer, a mobile telephone, a smart phone device, a portable game player, a portable music player, a television with one or more processors embedded therein or coupled thereto or any other electronic device capable of accessing a network. In some implementations, the system 100 includes a combination of different types of client devices 116. For example, a combination of a personal computer and a mobile phone. As will be described below, it should be understood that the present technologies can operate on different models other than a client-server architecture. For example, the client devices 116 may include the collage layout generator 104 and include different services.

The browser 120 can be a web browser stored on the client device 116 and configured for two-way communications with the server 102. For example, the browser 120 is a software application for retrieving, presenting and traversing information resources on the World Wide Web. In particular, the browser 120 may be used to interact with the collage layout generator 104 by selecting pictures for input, and viewing or saving generated picture collages. In some instances, the collage layout generator 104 may also include graphical user interface (GUI) elements that allow the user to set or adjust parameters such as an output aspect ratio.

The network 106 enables communications between the client devices 116a-n and the server 102. Thus, the network 106 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 106 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 106 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In some implementations, the entities can use custom and/or dedicated data communications technologies instead of, or in addition to, the ones described above. Depending upon the implementation, the network 106 can also include links to other networks.

In some implementations, the network 106 is a partially public or a wholly public network, for example, the Internet. The network 106 can also be a private network or include one or more distinct or logical private networks (e.g., virtual private networks, Wide Area Networks ("WAN") and/or Local Area Networks ("LAN")). Additionally, the communication links to and from the network 106 can be wired or wireless (i.e., terrestrial or satellite-based transceivers). In some implementations, the network 106 is an IP-based wide or metropolitan area network.

The network 106 may have any number of configurations including a star configuration, token ring configuration or other configurations. Furthermore, the network 106 may include a local area network (LAN), a wide area network (WAN) (e.g., the Internet), and/or any other interconnected data path across which multiple devices may communicate. In some implementations, the network 106 may be a peer-to-peer network. The network 106 may also be coupled to or include portions of a telecommunications network for sending data in a variety of different communication protocols. In some implementations, the network 106 includes short-wavelength communication networks or a cellular communications network for sending and receiving data including via short messaging service (SMS), multimedia messaging service (MMS), hypertext transfer protocol (HTTP), direct data connection, wireless application protocol (WAP), electronic messages, etc.

The storage device 122 may be a non-transitory memory that stores data. For example, the storage device 122 may be a dynamic random access memory (DRAM) device, a static random access memory (SRAM) device, flash memory or some other memory device. In some implementations, the storage device 122 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or some other non-volatile storage device. In some implementations, the storage device 122 stores data received from and sent to users 118 to accomplish the functionalities described herein of the collage layout generator 104.

FIG. 2 is a block diagram illustrating an example collage layout generator 104 in a system 200. For example, the system 200 may be the server 102, the third-party server 108, or the client device 116. In the illustrated implementations, the system 200 includes a processor 242, a communication unit 244, a memory 246, and a storage device 122. These components of the system 200 are communicatively coupled to a bus or software communication mechanism 240 for communication with each other.

The processor 242 may include an arithmetic logic unit, a microprocessor, a general purpose controller or some other processor array to perform computations and provide electronic display signals to a display device. In some implementations, the processor 242 is a hardware processor. The processor 242 is coupled to the bus 240 for communication with the other components. Processor 242 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. It should be understood that other processors, operating systems, sensors, displays and physical configurations are possible.

The communication unit 244 may be coupled to the network 106. The communication unit 244 is also coupled to the bus 240. The communication unit 244 includes ports for wired connectivity including but not limited to USB, SD, or CAT-5, etc. The communication unit 244 links the processor 242 to the network 106 that may in turn be coupled to other processing systems 102, 108, and 116. The communication unit 244 provides other conventional connections to the network 106 using standard network protocols, e.g., TCP/IP, HTTP, HTTPS and SMTP. In some implementations, the communication unit 244 includes a transceiver for sending and receiving signals using WiFi, Bluetooth® or cellular communications for wireless communication.

The memory 246 stores instructions and/or data that may be executed by the processor 242. In the illustrated implementation, the memory 246 stores the collage layout generator 104. The memory 246 is coupled to the bus 240 for communication with the other components of the system 200. The instructions and/or data may include code for performing any and/or all of the techniques described herein. The memory 246 may be a dynamic random access memory (DRAM) device, a static random access memory (SRAM) device, flash memory or some other memory device.

The storage device 122 may be a non-transitory memory that stores data. For example, the storage device 122 may be a dynamic random access memory (DRAM) device, a static random access memory (SRAM) device, flash memory or some other memory device. In some implementations, the storage device 122 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or some other non-volatile storage device. In some implementations, the storage device 122 stores data received from and sent to users 118 to accomplish the functionalities described herein of the collage layout generator 104.

Software communication mechanism 240 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc.). The software communication mechanism 240 can be implemented on any underlying hardware, for example, a network, the Internet, a bus, a combination thereof, etc.

The collage layout generator 104 includes a controller 202, a layout component 204, a crop component 206, a picture grouping component 208, a stretch component 210, a detail recognition component 212, a snap component 214, a pairwise component 216, a group distance component 217, a similarity component 218, and an aspect ratio component 220.

The controller 202 can be software or routines for handling communications between the layout component 204, the crop component 206, the picture grouping component 208, the stretch component 210, the detail recognition component 212, the snap component 214, the pairwise component 216, the group distance component 217, the similarity component 218, and the aspect ratio component 220. The controller 202 also facilitates communication with the other components of the system 200 as well as communication with the other components of the system 100 via the communication unit 244 and the network 106. For example, the communication unit 244 may send signals between servers 102, 108 and the components of the collage layout generator 104. In some implementations, the communication unit 244 is a set of instructions executable by the processor 242. In some implementations, the communication unit 244 is stored in the memory 246 of the system 200 and is accessible and executable by the processor 242. In some implementations, the communication unit 244 is adapted for cooperation and communication with the processor 242, the memory 246 and other components of the collage layout generator 104 via the bus 240. The controller 202 may receive the plurality of pictures to arrange into a collage via the communication unit 244.

The pairwise component 216 can be software or routines for calculating pairwise distances between the pictures. The pairwise component 216 may receive the plurality of pictures from the layout component 204 and may return a matrix of pairwise values between the plurality of pictures. In some instances, the pairwise component 216 may be adapted for calculating a pairwise distance between a picture and a group of pictures or a between two or more groups of pictures. In some instances, the pairwise component 216 may determine the pairwise distance based on size or picture similarity. Thus the pairwise component 216 may communicate with the similarity component 218 as discussed below.

The group distance component 217 can be software or routines for calculating group distances across the pictures included in the group. In some instances the arrangement of the pictures into one or more groups may be based on a calculation across the pictures included in the group. The group distance component 217 may receive the plurality of pictures from the layout component 204 and may return one or more values between the plurality of pictures. In some instances, the group distance component 217 may be adapted for group distances across the pictures included in the group. In some instances, the group distance component 217 may communicate with the similarity component 218 or the detail recognition component 212. For example, a minimum or maximum size picture may be calculated across the pictures in the group. If a picture is less than the minimum size it may be moved to another group or increased in size, or if the picture is greater than the maximum size, it may be decreased in size or moved to a different group. In another example, recognized facial sizes may be calculated across the pictures in the group in order to arrive at a collage with similar facial sizes. For instance, a group photo may recognize smaller facial sizes compared to a recognized facial size in a portrait photo such that the picture grouping component 208 may group the smaller facial sizes and the larger facial size in groups as may be appropriate. For example, the picture grouping component 208 may group the pictures such that the final collage has pictures where the recognized faces are similarly sized despite differences in inputted facial picture sizes. In situations in which facial recognition is used, explicit user authorization is sought, and facial recognition techniques are performed and/or face recognition information is collected or stored only upon receiving user authorization. The picture grouping component 208 may communicate with the pairwise component 216 and/or the group distance component 217.

The layout component 204 can be software or routines for generating a collage layout based on the received pictures. The layout component 204 may communicate with the controller 202 and receive 302 the plurality of pictures. The layout component 204 may transmit the plurality of pictures to the pairwise component 216 and/or the group distance component 217 and receive pairwise or group distance values for the plurality of pictures from the pairwise component 216 and/or the group distance component 217. Based on the pairwise values received from the pairwise component 216 and/or the group distance component 217, the layout component 204 may transmit the plurality of pictures and pairwise values to the picture grouping component 208 and receive the plurality of pictures arranged 306 into one or more groups from the picture grouping component 208. A detailed example of arranging 306 the pictures into one or more groups is discussed below with reference to FIG. 4. In some instances, the layout component 204 may be adapted for calculating 308 a group arrangement cost and determining 310 an arrangement of the groups based on the group arrangement costs. In one example, the layout component 204 may communicate with the aspect ratio component 220 to calculate the group arrangement costs based on an aspect ratio of the groups. In some instances, the layout component 204 may place 312 or assign the pictures in a collage layout based on arrangement of the groups and arrangement of the pictures in the groups. In some instances, the layout component 204 receives the pictures from the controller 202 and transmits the pictures to the picture grouping component 208 to determine a grouping of the pictures. In one instance, the layout component 204 may then instantiate various permutations of the groups returned from the picture grouping component 208 and calculate costs for the permutations based on how close the resulting aspect ratio of the groupings is to a predetermined aspect ratio.

The crop component 206 can be software or routines for determining what pictures from a group of pictures to crop, and what areas of a picture to crop. In some instances, the functionality of the crop component 206 may be invoked by the layout component 204. In some instances, the controller 202 may invoke the functionality of the crop component 206. In some instances, the crop component 206 may be adapted to determine what areas of a picture to crop based on recognized details provided by the detail recognition component 212. Thus, the crop component 206 may receive the plurality of pictures and a collage layout from the layout component 204 or the controller 202. The crop component 206 may transmit the plurality of pictures to the detail recognition component 212 which may return bounding coordinates of details on pictures where details have been recognized by the detail recognition component 212. The crop component 206 may determine how much area of a picture should be cropped based on a framed area of the collage layout in which the picture is to be placed or a center or other point of the framed area. If the length of a picture matches, the width may be too large for the framed area. Likewise if the width matches, the length may be too large for the framed area. The crop component 206 may attempt to equally or proportionally crop the remaining length or width. For instance if the picture is 100 pixel widths too wide, the crop component 206 may crop 50 pixel widths from the left-side of the picture and 50 pixel widths from the right-side of the picture. The crop component 206 may offset this even splitting based on recognized detail received from the detail recognition component. For instance, where the bounding coordinates of a recognized detail reach the far right-side of the picture, the crop component may not crop the right-side of the picture. In another example, where the bounding coordinates of a recognized detail are slightly offset from a center of the picture, more cropping may be proportionally performed on the side(s) further away from the bounding coordinates. The cropped pictures are then provided by the crop component 206 for use by other components of the collage layout generator 104.

In some instances, the crop component 206 may optionally determine or calculate one or more important regions for one or more of the pictures. The calculation of important regions is useful in pre-cropping pictures to create more interesting layouts. For example, in instances where the input pictures are square, the crop component 206 may calculate important regions of the pictures and pre-crop some of the pictures to create a layout with fewer square pictures and thus a potentially more interesting collage layout. This is described in more detail below with reference to FIG. 3.

The picture grouping component 208 can be software or routines for arranging the pictures into one or more groups based on the pairwise distances between the pictures. In some instances the arrangement of the pictures into one or more groups may be based on a calculation across the pictures included in the group. The picture grouping component 208 may communicate with the pairwise component 216 and/or the group distance component 217. Some non-limiting examples of pairwise distance calculations include size similarity, content similarity, and aspect ratio similarity. For example, size similarity may be determined by calculating the distance in areas covered between two pictures. A 3 inch by 5 inch picture covers 15 square inches, where a 4 inch by 4 inch picture covers 16 square inches. In this example, the pairwise distance calculation between the two pictures based on size similarity may be 1 (e.g. 16 square inches minus 15 square inches is 1). In some instances, the picture grouping component 208 may arrange the pictures into three equally sized groups. In some instances, the picture grouping component 208 may make use of data structures, for example trees, to order the pictures and efficiently calculate pairwise distances between pictures and groups of pictures. One implementation for the picture grouping component 208 is described below with reference to FIG. 4. Thus the picture grouping component 208 may communicate data such as pictures and/or data structures to the pairwise component 216 and/or the group distance component 217. In some instances, the arrangement of the pictures into one or more groups may be based both on one or more of calculation across the pictures in the group, and pairwise distances between pictures or other factors.

The stretch component 210 can be software or routines for stretching the collage layout to a specified collage aspect ratio. In some instances, the stretch component 210 may be adapted to shrink a horizontal or vertical size of the collage layout. For instance, a determination of whether to stretch a preliminary collage layout or shrink the preliminary collage layout may be based on the resolution of the underlying pictures. The stretch component 210 may receive pictures from the layout component 204. In one example, the collage layout may be stretched in one or more directions. For instance, the collage layout may be stretched to fit the vertical dimension of a picture. The picture may then be cropped in the horizontal dimension in order to fit the collage layout.

The detail recognition component 212 can be software or routines for performing detail recognition on the pictures. In some instances, the detail recognition component 212 may be invoked by the crop component 206 in order to base cropping on recognized details in the picture. In some instances, the detail recognition component 212 may analyze placement of metadata tags embedded in a picture. For instance, a bounding box may be placed by a user or software system around persons or objects in a picture. Additionally the picture may have a tag such as a location or named place. In some instances, the detail recognition component 212 may perform gradient detail recognition on a picture to find areas of high spatial detail. Bounding areas may be returned to the crop component 206. In one example, the bounding areas may be a set of coordinate values encompassing an area of high spatial detail. In some instances, bounding areas may be weighted. Where a picture has multiple bounded areas, some of which need to be cropped, the bounded areas with higher weighting (e.g. higher detail) may be favored from being cropped and lower weighted bounded areas may be cropped to preserve the higher weighted areas from being cropped.

The snap component 214 can be software or routines for snapping collage layout lines together that are nearly along the same horizontal or vertical axis. The snap component may receive a preliminary collage layout from the layout component 204 and return a snapped collage layout that is a snap adjusted version of the preliminary collage layout. Collage layout lines may be visible or invisible. Collage layout lines form frames that demarcate the top, bottom, left, and right side in which pictures can be placed in the collage layout. Thus frame lines may be a subset of the collage layout lines that bound a single frame. For example, if a first line is within a threshold number of pixels from a second line, the first line and/or the second line of the collage layout may be moved such that the first line and the second line align along a common horizontal or vertical axis. The pictures then may be copied, moved, or referenced in memory to place the pictures in the frames formed by the collage layout. Visible frame lines may be a predefined width or may be user adjustable.

The similarity component 218 can be software or routines for calculating similarity. The similarity component 218 may receive a pair of pictures from the pairwise component 216 and return a calculated similarity value between the pair of pictures. In some instances, the similarity component 218 may calculate three-dimensional histograms from the pictures, apply a Gaussian blur to the three-dimensional histograms to form three-dimensional blurred histograms, and calculate Euclidean distances between the three-dimensional blurred histograms to arrive at a picture similarity. In general the similarity component 218 may be used to arrange pictures based on picture size similarity when the pictures are placed in the collage layout and thus may communicate with the layout component 204 and/or the picture grouping component 208.

The aspect ratio component 220 can be software or routines for determining and/or applying an aspect ratio for a collage layout. In some instances, the aspect ratio component 220 may select the specified collage aspect ratio from several common aspect ratios. Some common aspect ratios include, for example, approximately, 1:1, 2:1, 4:3, 3:2, 16:9 and 3:1. In some instances, the aspect ratio is determined automatically, for example, based on a set default, based on attributes or setting of display that is presenting the collage, based on user input or any combination of these. This automatic setting is described in more detail below with reference to FIG. 3.

The collage layout generator 104 is configured to perform a number of functions including, but not limited to: receiving a plurality of pictures to arrange into a collage; calculating pairwise distances between the pictures; arranging the pictures into one or more groups based on the pairwise distances between the pictures; calculating a group arrangement cost based on an aspect ratio of the groups; determining an arrangement of the one or more groups based on the group arrangement cost; and placing the pictures in a collage layout based on the arrangement of the one or more groups. Thus the collage layout generator 104 may communicate, either directly or indirectly, as described herein, with the crop component 206, the picture grouping component 208, the stretch component 210, the detail recognition component 212, the snap component 214, the pairwise component 216, the similarity component 218, and the aspect ratio component 220. The collage layout generator 104 may communicate with some or all of these components through the controller 202 and may additionally communicate with external systems and users via the controller 202. These components cooperate to provide the functions described above and described in detail herein The controller 202, the layout component 204, the crop component 206, the picture grouping component 208, the stretch component 210, the detail recognition component 212, the snap component 214, the pairwise component 216, the group distance component 217, the similarity component 218 and the aspect ratio component 220 may be software or routines. In some implementations, the controller 202, the layout component 204, the crop component 206, the picture grouping component 208, the stretch component 210, the detail recognition component 212, the snap component 214, the pairwise component 216, the group distance component 217, the similarity component 218 and the aspect ratio component 220 may be a set of instructions executable by the processor 242. In some implementations, the controller 202, the layout component 204, the crop component 206, the picture grouping component 208, the stretch component 210, the detail recognition component 212, the snap component 214, the pairwise component 216, the group distance component 217, the similarity component 218 and the aspect ratio component 220 are stored in the memory 246 of the system 200 and are accessible and executable by the processor 242. In some implementations, The controller 202, the layout component 204, the crop component 206, the picture grouping component 208, the stretch component 210, the detail recognition component 212, the snap component 214, the pairwise component 216, the group distance component 217, the similarity component 218 and the aspect ratio component 220 are adapted for cooperation and communication with the processor 242, the memory 246 and other components of the system via the software communication mechanism 220.

Figure 3:
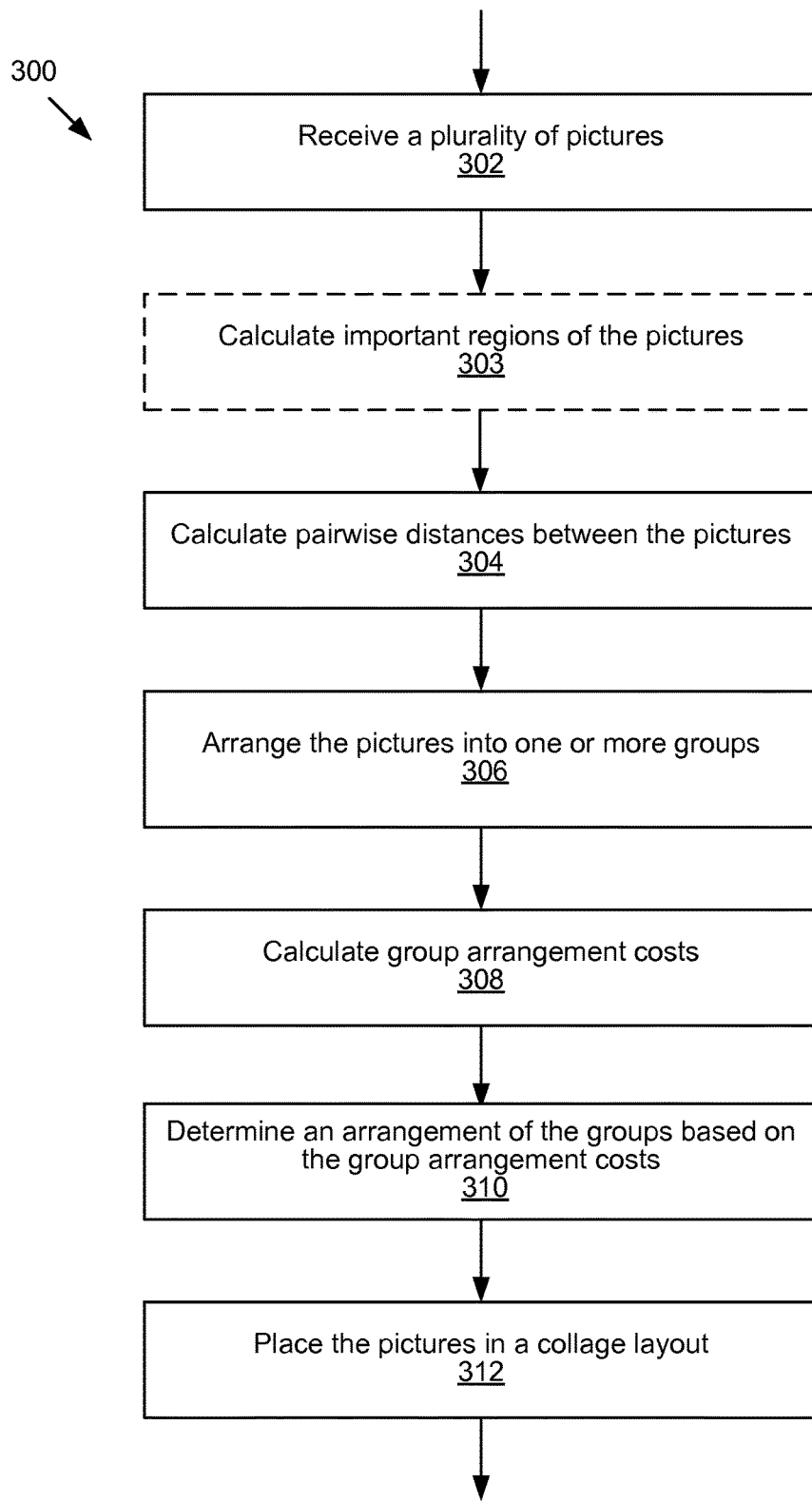
FIG. 3 is a flow chart of an example method for generating collage layouts.

FIG. 3 is a flow chart of an example method 300 for generating collage layouts. The method 300 begins by receiving 302 a plurality of pictures to arrange into a collage. In some instances, the pictures may be photographic images, such as portraits, group photos or landscapes, drawings, illustrations, representations, icons, artwork prints or the like. Photographic images of persons may include metadata tagging the persons in the photograph by location of the person's face in the picture. In situations in which facial recognition is used, explicit user authorization is sought, and facial recognition techniques are performed and/or face recognition information is collected or stored only upon receiving user authorization.

The pictures may be any type of digital image. For example, the input picture may be a file formatted as a bitmap, jpeg, or a portable networks graphic file. In one example, the controller 202 may receive the pictures, check that the pictures are properly formatted, and transform the pictures into data structures defined by the collage layout generator 104. Optionally, an important region for each of the pictures may be calculated 303. The calculation of important regions may be useful in pre-cropping pictures to create more interesting layouts. For example, in instances where the input pictures are square, the method may calculate 303 important regions of the pictures and pre-crop some of the pictures to create a layout with fewer square pictures and thus a potentially more interesting collage layout. In some instances, this pre-cropping may be based on details that are different than the cropping specified with reference to FIG. 5. In other instances, this pre-cropping may be based on some or all of the same details that are specified with reference to FIG. 5.

In some instances, a collage aspect ratio may also be received by the controller 202 from the user or the collage aspect ratio may be passed into the controller 202 via an application programming interface (API) from another application in the system 100 or set to be a default aspect ratio. In some instances, the collage aspect ratio received by the controller 202 may be communicated to the aspect ratio component 220.

As noted above, the collage aspect ratio may be automatically determined in some instances, the aspect ratio is determined automatically based on a set default, based on attributes or setting of display that is presenting the collage, based on user input or any combination of these. In some instances, the collage aspect ratio may be automatically and dynamically generated based on the inputted pictures by the collage layout generator 104. For example, the most common aspect ratio amongst the received pictures may be selected as the collage aspect ratio. In another example, the lengths and widths of the inputted pictures may be summed by the aspect ratio component 220 and the summed lengths and widths of the inputted pictures may form the collage aspect ratio. In a further example, the lengths and widths of the inputted pictures may be summed and the ratio formed by the summed lengths and widths may be rounded to the nearest predefined aspect ratio stored in the storage device 122. Some common aspect ratios that may be predefined and stored in the storage device 122 may include, for example, approximately, 1:1, 2:1, 4:3, 3:2, 16:9, and 3:1. In yet a further example, the collage aspect ratio may be defined subsequent to forming a preliminary collage layout. A collage layout may be formed as described herein, after which the aspect ratio of the preliminary collage layout may be rounded to the nearest predefined aspect ratio.

The method 300 calculates 304 pairwise distances between the pictures. In one example, the pairwise component 216, described with reference to FIG. 2, may instantiate a data structure and calculate pairwise distances between pictures based on a property. In one instance, the property may be picture similarity. In one instance, the property may be size, color usage, subject matter or picture date, to illustrate a few non-limiting examples. In one instance, to perform the calculation, the pairwise component 216 may select and pass a pair of pictures to the similarity component 218 which may then in turn communicate a similarity score (e.g. a size similarity score, a picture similarity score, etc.) between the pair of pictures. In one example, an average color of the pictures may be determined by summing up the red, green and blue components of the pixels of the picture and dividing those summed red, green and blue numbers by the total number of pixels in the picture. The average color of a picture may then be compared to the average color of another picture by comparing the averaged red, green and blue values as heretofore described. Pictures with similar red, green, and blue (RGB) average values may then have a high similarity score returned by the similarity component 218. For instance, a picture of the flag of the People's Republic of China may have an average RGB value of 170, 56, 30 whereas a picture of the flag of the Socialist Republic of Vietnam may have an average RGB value of 168, 66, 40. Thus, in one example, the pairwise similarity distance between the Chinese flag and the Vietnamese flag may be 22 and thus be relatively similar (e.g. 170−168=2, 66−56=10, 40−30=10; and 2+10+10=22). In another example, a picture of a black mid-size car and another picture of a white mid-size car may have a much further pairwise similarity distance on the order of 700 and thus not be very similar at all. In some instances, a color score satisfying a predefined threshold will be considered similar while color scores not satisfying the threshold will not be considered similar. In another instance, the similarity component may generate a histogram to compare pictures, or the product of lengths and widths of the pictures may be multiplied to arrive at a size similarity score. The distances between the peaks and valleys of the histogram may be compared to find the difference between the pair of pictures and thus sum of the differences may be used as one example of the similarity score.

The method 300 arranges 306 the pictures into one or more groups based on the pairwise distances between the pictures with the picture grouping component 208. In one instance, the picture grouping component 208 may be invoked by the layout component 204 and may create groups using a variety of techniques. For instance, dynamic programming or greedy selection may be used to place the pictures into groups based on the group arrangement cost. The picture grouping component 208 may transmit the plurality of pictures to the pairwise component 216 and receive in return a matrix with pairwise costs for each pair of pictures. Pictures may be added to the group one by one in a way that each addition creates the overall lowest cost. A group of pictures may be the sum of the pairwise calculation of the members of the group. In some instances, the pictures may also be added in a way that approximates the specified aspect ratio at each picture addition. For example, in a 1:1 ratio where the group of pictures before an addition form a more horizontal rectangle, a picture may be added with an aspect ratio that brings the group of pictures closer to a square 1:1 ratio my adding the picture in the vertical direction. In one example, an odd number of groups are created. In some instances, the pictures may also be added to achieve a particular symmetry or asymmetry. For example, a set of three pictures where the dominant color in each picture is respectively red, red, blue, may be added to the group of pictures such that there is a dominantly red picture on each side of the dominantly blue picture. This processing for symmetry or asymmetry may occur at various points in the method 300 prior to actually placing 312 the pictures in the collage layout or snapping 504 dividing lines together in the collage layout. In one particular example, a small number of groups such as three may be created. The method 300 calculates 308 group arrangement costs based on an aspect ratio and determines 310 an arrangement of the one or more groups based on the arrangement cost with the layout component 204. As discussed herein, when the groups are combined to form a collage layout, various combinations of the groups may be permuted and a specific group combination may be selected based on a formed aspect ratio. Further details of the functionality of the imaging grouping component 208 and the layout component 204 are described above with reference to FIG. 2, and below with specific illustrating examples with reference to FIGS. 4 and 6.

The method 300 places 312 the received pictures into a collage layout based on arrangement of the groups and arrangement of the pictures in the groups. Several components in the system 200 may be used to perform this placement 312. For example, the detail recognition component 212 may analyze the pictures and determine which pictures are more suitable for cropping. The crop component 206 may crop the pictures to fit in the collage layout. The snap component 214 may adjust the collage layout to snap collage layout lines together that are nearly along the same horizontal or vertical axis. For example, if a first line is within a threshold number of pixels from a second line, the first line and/or the second line of the collage layout may be moved such that the first line and the second line align along a common horizontal or vertical axis. The pictures then may be copied or moved in memory such to reside in the frames formed by the collage layout. The frame lines may be a predefined width or may be adjusted.

Figure 4:
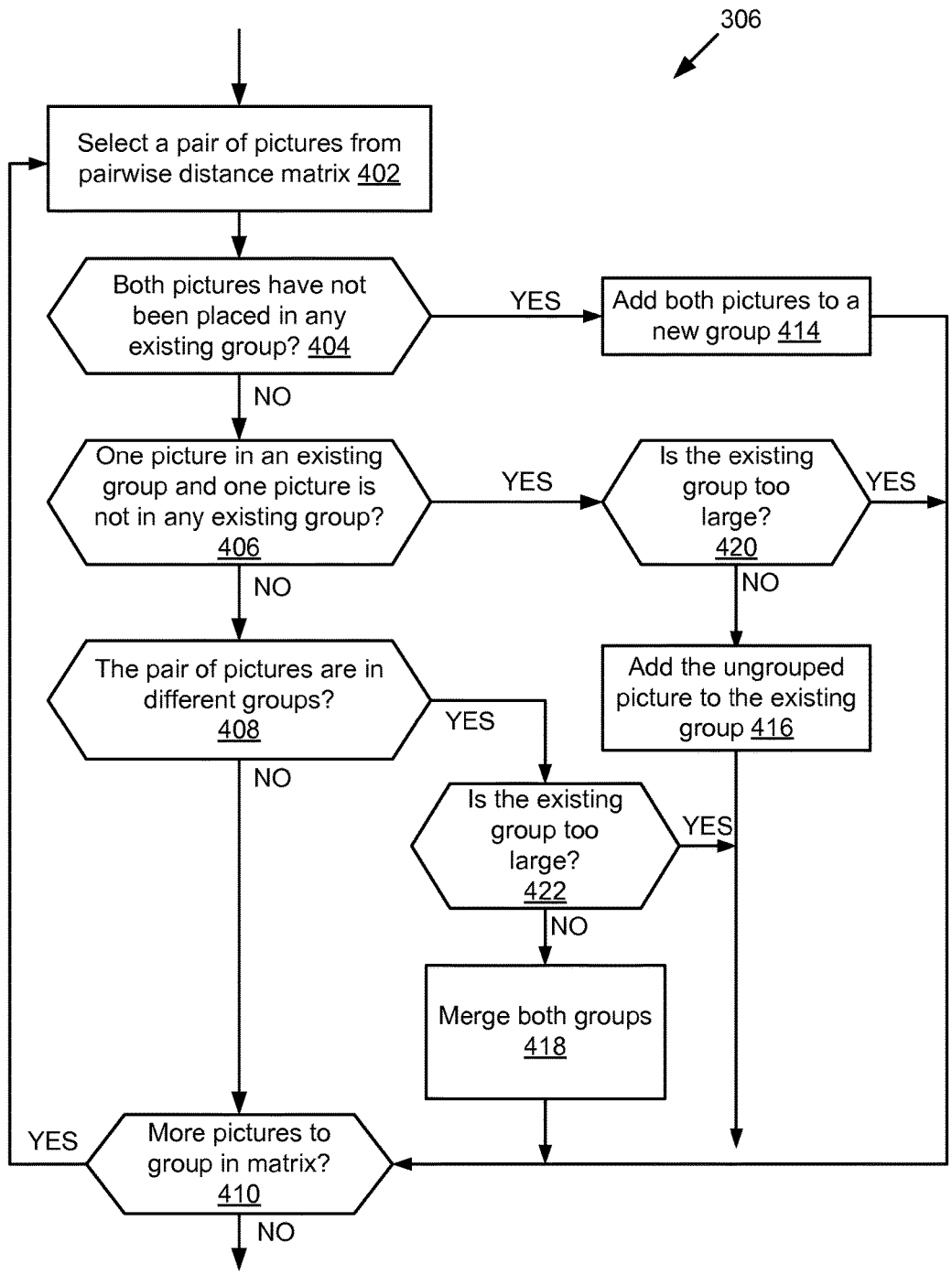
FIG. 4 is a flow chart of an example method for arranging pictures into one or more groups.

FIG. 4 is a flow chart of an example method 306 for arranging pictures into one or more groups. In particular, the method 306 is further detail of the block 306 shown in FIG. 3 where the method 300 dynamically generates a collage layout. In one instance, a matrix is instantiated in the memory 246 with the indices therein representing a pair of pictures from the received pictures and values stored in the matrix is the pairwise distances between pictures. The picture grouping component 208 may sequentially process the matrix and arrange the pictures into one or more groups. The method 306 selects 402 a pair of pictures from a pairwise distance matrix. The pairwise distance matrix may be generated by the pairwise component 216 from the plurality of pictures. The method 306 may process the distance matrix. For example, the method 306 may process a matrix with indices 'i' and 'j' by first processing the 'i' values from low value to high value and secondarily processing the 'j' values.

The method 306 determines 404 whether the pair of pictures is not in any existing group. For example, the method 306 may add pictures to a data structure, for example, an ordered tree or an ordered list. In one example, there may be a separate data structure for each group. Thus, in one example a picture that is not in any existing group may have yet to be assigned or placed into one of the group data structures. If the pair of pictures are not in any existing group, the method 306 adds 414 both of the pictures to the a new group (e.g., new data structure), the method 306 proceeds to block 410. Otherwise, the method 306 determines 406 whether one picture from the pair of pictures is in an existing group, e.g., group 'G' while the other picture from the group of pictures is not in any existing group. If so, the method 306 determines 420 whether the existing group is too large. In one instance, a group is considered to be too large where the number of pictures in the group is greater than the total number of received pictures divided by the number of groups, for example, three. In this way, the number of groups may be limited to three. In other instances, the number of groups may be similarly limited to an odd number. Three groups, or a number of odd groups, may be more easily combinable into a collage layout with an aspect ratio that is approximately close to the specified aspect ratio. Three groups may allow the order of exponential computational complexity to be manageable while providing a mechanism to combine the three groups that results in a collage layout that approximates a specified aspect ratio. By generating a collage layout that approximates a specified aspect ratio, the pictures may be cropped less when placed in the collage layout. If the group is determined to be too large, the method 306 proceeds to block 410. On the other hand, if the group is not determined to be too large in block 420, the method 306 adds 416 the ungrouped picture to group 'G' then the method 306 proceeds to block 410.

If in block 406, the method 306 did not determine that one picture from the pair of pictures was in an existing group while the other picture was not in any existing group, the method 306 determines 408 whether the pair of pictures are in different groups. If the method 306 determined that the pair of pictures are not in different groups, the method 306 proceeds to block 410. However, if in block 408 determined that the pair of pictures are in different groups, the method 306 continues to block 422 to determine whether the combined group would be too large. If so, the method 306 the method 306 leaves the existing groupings alone and proceeds to block 410. If not, the method 306 merges 418 the two different groups together after which the method 306 continues 410 to process through the matrix.

Figure 5:
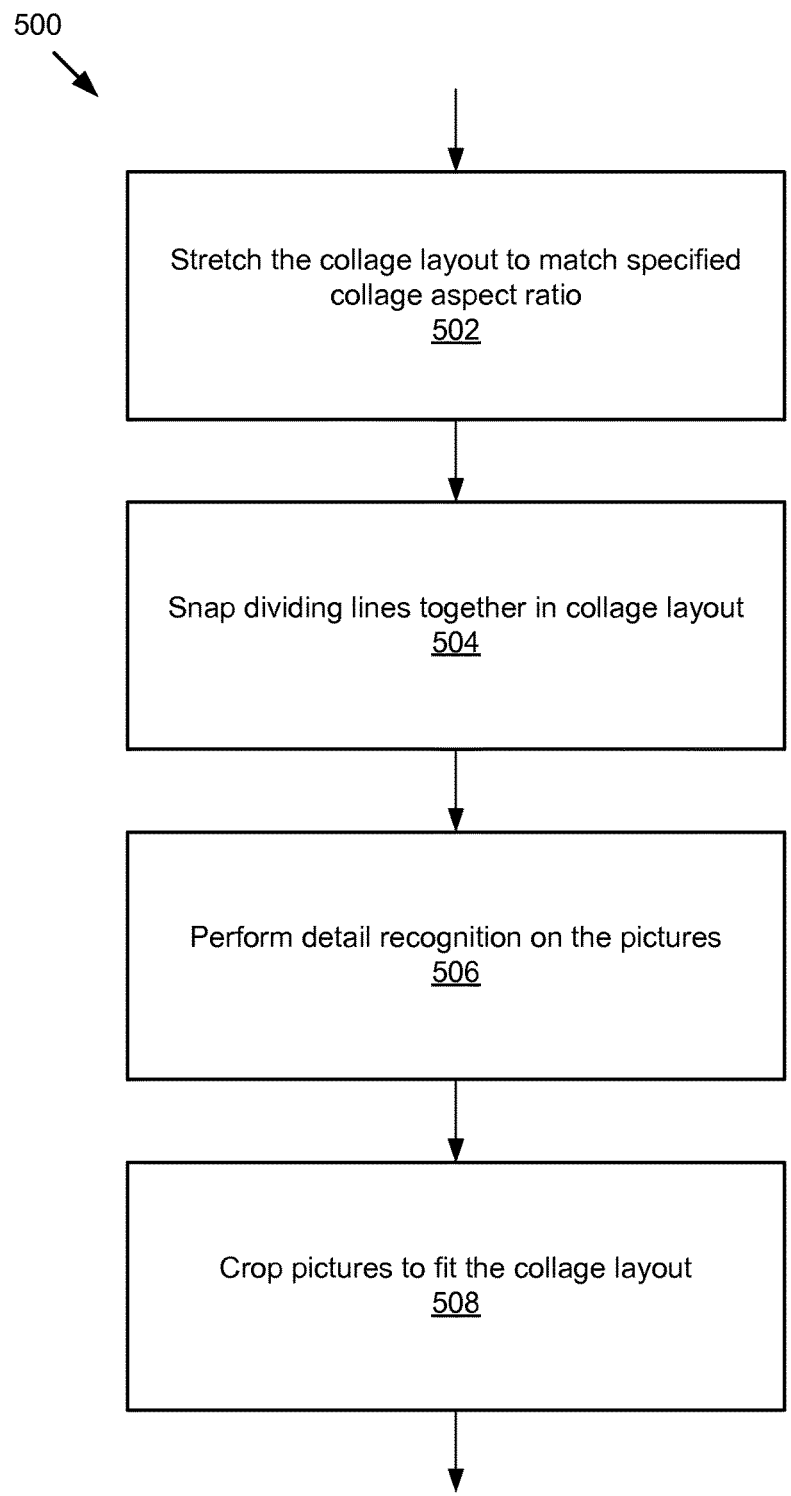
FIG. 5 is a flow chart of an example method for transforming a collage.

FIG. 5 is a flow chart of an example method 500 for transforming a collage. The method 500 stretches 502 the collage layout to match a specified collage aspect ratio with the stretch component 210. The stretch component 210 may receive the specified collage aspect ratio from the controller 202 which may in turn receive it through the communication unit 244 from a user 118 or another application in the system 100 through an API. In one instance, specified collage aspect ratio may be selected from predefined common aspect ratios, for example, approximately a 1:1, 2:1, 4:3, 3:2, 16:9 or 3:1 aspect ratio. The framed areas in the collage layout may also have a specified aspect ratio and the pictures may be placed in the collage layout based on the pictures' aspect ratio. Collage layout lines form framed areas that demarcate the top, bottom, left, and right side in which pictures can be placed in the collage layout.

The method 500 snaps 504 dividing lines in the collage layout together. A dividing line is a line, either visible or invisible, where edges of pictures in the collage meet. In some instances, a black visible line of a narrow pixel width is place between pictures. If a first line is within a threshold number of pixels from a second line, the first line and/or the second line of the collage layout may be moved such that the first line and the second line align along a common horizontal or vertical axis. To perform this snapping, the frames may be stretched or shrunk in order to effectuate the alignment of the dividing lines. Further, pictures placed in the frames may also be adjusted through stretching or shrinking to fit within the frames with and may also be cropped on one or more sides.

The method 500 performs 506 detail recognition on the pictures with the detail recognition component 212, and cropping 508 the pictures to fit the collage layout. In some instances, the detailed recognition may be based on tagged details such as a face or object in a photograph. In situations in which facial recognition is used, explicit user authorization is sought, and facial recognition techniques are performed and/or face recognition information is collected or stored only upon receiving user authorization. In some instances, the detailed recognition may include performing gradient detail recognition. For example, a filter may be applied to a picture such that edges are detected in the picture. A plurality of edges in a particular portion of the picture may indicate a high level of detail in that portion of the picture. For example, the crop component 206 may transmit the plurality of pictures to the detail recognition component 212 which may return bounding coordinates of details on pictures where details have been recognized by the detail recognition component 212. The crop component 206 may determine how much area of a picture should be cropped based on a framed area of the collage layout in which the picture is to be placed. Thus, the crop component 206 may be instructed to avoid cropping that portion of the picture in favor or cropping a portion of the picture with fewer edges or an area where no clear edges are detected.

Figure 6:
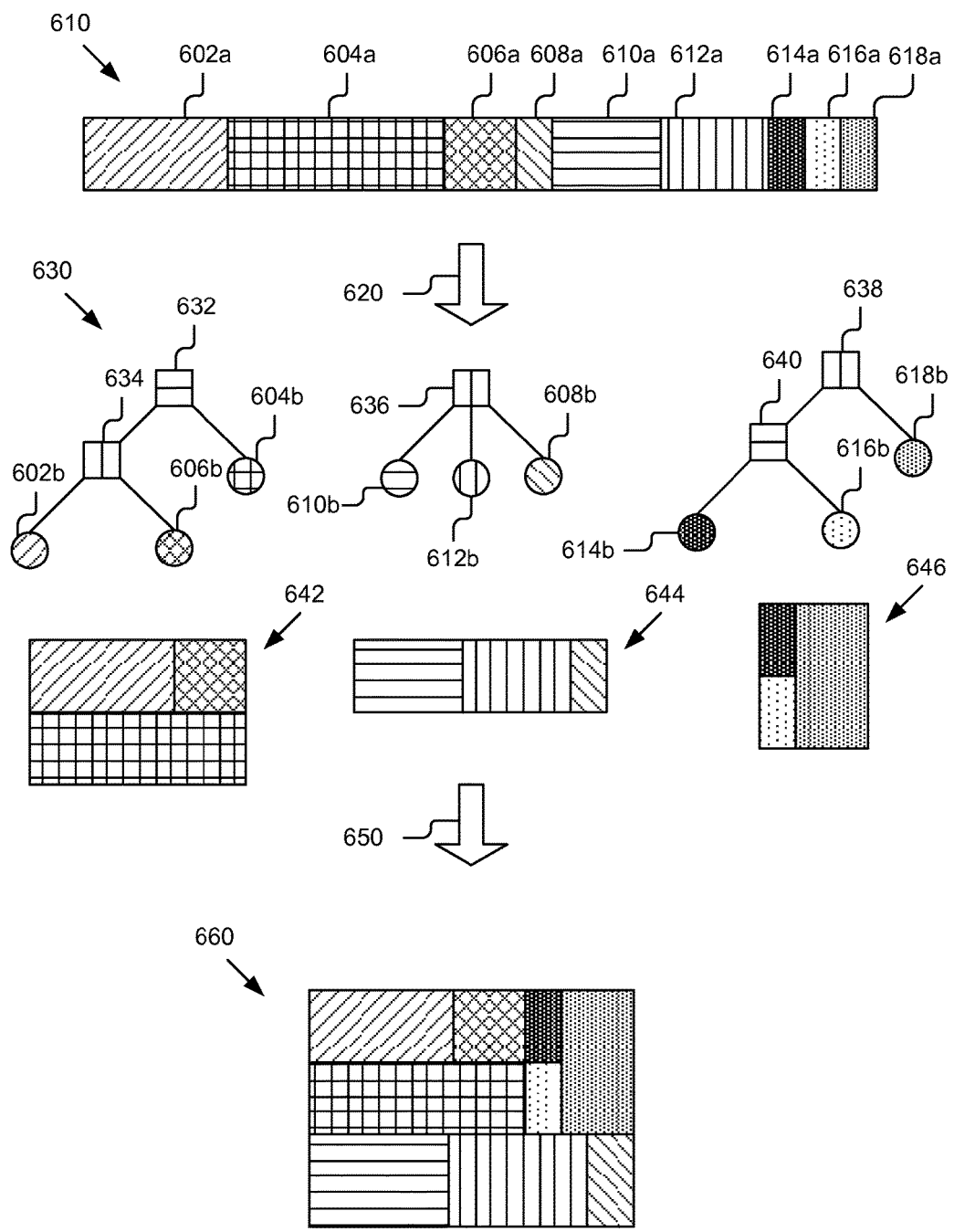
FIG. 6 is a graphic representation of a method for generating a collage layout.

FIG. 6 is a graphic representation of generating a collage layout 660. A plurality of pictures 610 are provided. In this example there are nine different pictures. The nine pictures 602a, 604a, 606a, 608a, 610a, 612a, 614a, 616a, 618a are represented with different cross hatchings. The plurality of pictures 610 are grouped 620 into three groups by the above methods. For example, the method first selects a pair of pictures, for example, pictures 602a and 604a. Pictures 602a and 604a are determined in 404 not to be in any existing group and are therefore added to a new group 630. Next, the method selects another pair of pictures, for example, pictures 604a and 606a. Since picture 604a in this example is already in an existing group 630 while picture 606a is not in an existing group 406, picture 606a is added 416 to the existing group 630 if the existing group 404 is not too large 420. In this example, nine divided by three (e.g., three groups) is three so the existing group 630 is not too large. The remaining pictures 608a, 610a, 612a, 614a, 616a, 618a are processed with the method of FIG. 4 resulting in the three tree structures with root nodes 632, 636 and 638. While different numbers of groups may be formed, three groups may lower the order of computational complexity. In particular, in combining 650 the groups of pictures 642, 644, 646 into a collage, an exponential number of permutations may be instantiated to calculate aspect ratio costs amongst the various permutations. Generally the permutation with an aspect ratio cost below a threshold may be selected as the collage layout. The aspect ratio cost may be derived from the amount of stretching and/or cropping to be performed on the group of pictures 642, 644, 646 to arrive at the specified aspect ratio.

The pictures 602a, 604a, 606a, 608a, 610a, 612a, 614a, 616a, 618a are arranged in groups 630. Generally, the groups are ordered collections that represent a sub-collage. In one instance the groups may be an ordered list of pictures from left to right with an indicator for when a new row or column of pictures is to be included in the collage. The ordered list may also include metadata which specifies the size of each row or column of the collage layout.

In another example, the ordered collection may be represented in an ordered tree. Each leaf node in an ordered tree may represent a picture. In some instances, the leaf node may contain the picture, while in other instances the leaf node may refer to a memory or disk location of the picture. In some instances the leaf node may include some discrete properties of a picture such as size, aspect ratio, etc. Exemplary leaf nodes 602b, 604b, 606b, 608b, 610b, 612b, 614b, 616b, 618b are depicted in FIG. 6. In another example, the groups may be an ordered collection maintained with underlying linked lists, array lists, or vectors.

Interior nodes 632, 634, 636, 638, 640 in an ordered tree represent a group of pictures. The interior nodes 632, 634, 636, 638, 640 also represent a partition (e.g., vertical or horizontal split) in the grouping of pictures. For example, the interior node 636 is depicted with a vertical line indicating a vertical partition or arrangement of the group of pictures 610b, 612b 608b depicted beneath the interior node 636. Thus, the depicted group 644 of the tree rooted at the interior node 636 shows the pictures 610a, 612a 608a arranged from left to right along a single row. While the depicted example shows an ordered tree, it should be noted that other data structures that form ordered collections may be used to implement the technology. Similar processing is shown with groups 642 and 646.

In arranging the pictures 602a, 604a, 606a, 608a, 610a, 612a, 614a, 616a, 618a into groups 630, the process outlined above with reference to FIG. 4 may generally be followed. Additionally, when a leaf node (e.g., a picture) is added to a tree (e.g., one of the groups 630) the leaf node is placed so that pictures with close pairwise properties are grouped together. Further, an interior node property value for pairwise calculations may be calculated by taking the average property of the nodes beneath the interior node. In placing a new node in accordance with the process outlined in FIG. 4, a low pairwise cost of the tree overall may be sought without rearranging the tree significantly. In one instance, there may be an upper threshold of tree re-arrangement moves to limit significant rearranging of the tree. For example, the new node may be placed at the existing interior node level or a new lower interior node may be added with the new node. Thus, pairwise distances between the plurality of pictures are calculated and the plurality of pictures are arranged 620 into one or more groups based on the pairwise distances between the plurality of pictures. The group arrangement costs are calculated based on an aspect ratio of the one or more group, an arrangement of the one or more groups is determined based on the group arrangement cost, and the pictures are placed 650 in a collage layout based on the arrangement of the one or more groups. In some examples, placement 650 of the pictures may be based on similarity. For example, pictures that are similar may be placed close together. In one instances, the group of pictures 642, 644, 646 may be rearranged when they are placed together to form the collage 660. As an illustrative example, the order of the pictures in the group 644 may be rearranged without impacting the group's 644 formed aspect ratio.

Once the pictures are arranged in the groups, various group arrangement costs may be considered and the groups may be arranged together before placing the pictures in the collage layout. The various group arrangement costs may be calculated and stored in a similar manner as ordered trees. In particular, the groups 630 may be joined as ordered tree and the arrangement cost may be based on an aspect ratio naturally formed from the pictures making up the groups 630.

In situations in which the systems discussed here may collect personal information about users, or may make use of personal information, users are provided with one or more opportunities as described above to authorize and control whether programs or features collect user information, e.g., information on user actions or activities, user preferences, content created or submitted by a user, or user location. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user has control over whether information is collected about the user and, if it is collected, how the information is used by a server.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing the terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but not limited to, any type of disk including floppy disks, optical disks, CDROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
   receiving a plurality of pictures to arrange into a collage;
   calculating pairwise distances between the plurality of pictures;
   arranging the plurality of pictures into one or more groups based on the pairwise distances between the plurality of pictures;
   calculating a group arrangement cost based on an aspect ratio of the one or more groups;
   determining an arrangement of the one or more groups based on the group arrangement cost; and
   placing the pictures in a collage layout based on the arrangement of the one or more groups.

2. The method of claim 1, wherein calculating the pairwise distances between the plurality of pictures comprises:
   calculating histograms from the plurality of pictures;
   applying a Gaussian blur to the histograms to form blurred histograms; and
   calculating Euclidean distances between the blurred histograms.

3. The method of claim 1, wherein calculating the pairwise distances between the plurality of pictures comprises:
   determining a first perimeter for a first picture and a second perimeter for a second picture;
   calculating a perimeter difference between the first perimeter and the second perimeter;
   determining a first area for a first picture and a second area for a second picture;
   calculating an area difference between the first area and the second area; and
   combining the perimeter difference and the area difference to form a pairwise distance between the first picture and the second picture.

4. The method of claim 1, wherein arranging the plurality of pictures into one or more groups comprises arranging the plurality of pictures into three groups.

5. The method of claim 1, wherein the group arrangement cost is also based on a picture size similarity.

6. The method of claim 1, further comprising stretching the collage layout to match a specified collage aspect ratio.

7. The method of claim 6, wherein the specified collage aspect ratio is selected from one of the following aspect ratios: 1:1, 2:1, 4:3, 3:2, 16:9, and 3:1.

8. The method of claim 6, further comprising automatically determining the specified collage aspect ratio based an output format for the collage.

9. The method of claim 1, further comprising cropping one or more pictures of the plurality of pictures to fit into the collage layout.

10. The method of claim 9, wherein cropping the one or more pictures is based on recognized details in the one or more pictures and further comprises performing detail recognition on the one or more pictures prior to cropping the one or more pictures, the detail recognition including at least one of tagged details recognition and gradient detail recognition.

11. A system comprising:
   one or more processors; and
   a memory storing instructions that, when executed, cause the system to:
      receive a plurality of pictures to arrange into a collage;
      calculate pairwise distances between the plurality of pictures;
      arrange the plurality of pictures into one or more groups based on the pairwise distances between the plurality of pictures;
      calculate a group arrangement cost based on an aspect ratio of the one or more groups;
      determine an arrangement of the one or more groups based on the group arrangement cost; and
      place the pictures in a collage layout based on the arrangement of the one or more groups.

12. The system of claim 11, wherein the memory further stores instructions to calculate the pairwise distances between the plurality of pictures that, when executed, cause the system to:
   calculate histograms from the plurality of pictures;
   apply a Gaussian blur to the histograms to form blurred histograms; and
   calculate Euclidean distances between the blurred histograms.

13. The system of claim 11, wherein the memory further stores instructions to calculate the pairwise distances between the plurality of pictures that, when executed, cause the system to:
   determine a first perimeter for a first picture and a second perimeter for a second picture;
   calculate a perimeter difference between the first perimeter and the second perimeter;
   determine a first area for a first picture and a second area for a second picture;
   calculate an area difference between the first area and the second area; and
   combine the perimeter difference and the area difference to form a pairwise distance between the first picture and the second picture.

14. The system of claim 11, wherein arranging the plurality of pictures into one or more groups comprises arranging the plurality of pictures into three groups.

15. The system of claim 11, wherein the group arrangement cost is also based on a picture size similarity.

16. The system of claim 11, wherein the memory further stores instructions that, when executed, cause the system to stretch the collage layout to match a specified collage aspect ratio.

17. The system of claim 16, wherein the specified collage aspect ratio is selected from one of the following aspect ratios: 1:1, 2:1, 4:3, 3:2, 16:9, and 3:1.

18. The system of claim 16, wherein the memory further stores instructions that, when executed, cause the system to automatically determine the specified collage aspect ratio based an output format for the collage.

19. The system of claim 11, wherein the memory further stores instructions that, when executed, cause the system to crop one or more pictures of the plurality of pictures to fit into the collage layout.

20. The system of claim 19, wherein cropping the one or more pictures is based on recognized details in the one or more pictures and further comprises performing detail recognition on the one or more pictures prior to cropping the one or more pictures, the detail recognition including at least one of: tagged details recognition and gradient detail recognition.

21. A computer program product comprising a non-transitory computer usable medium including a computer readable program, wherein the computer readable program when executed on a computer causes the computer to:
   receive a plurality of pictures to arrange into a collage;
   calculate pairwise distances between the plurality of pictures;
   arrange the plurality of pictures into one or more groups based on the pairwise distances between the plurality of pictures;
   calculate a group arrangement cost based on an aspect ratio of the one or more groups;
   determine an arrangement of the one or more groups based on the group arrangement cost; and
   place the pictures in a collage layout based on the arrangement of the one or more groups.

22. The computer program product of claim 21, wherein to calculate the pairwise distances the computer readable program when executed on the computer further causes the computer to:
   calculate histograms from the plurality of pictures;
   apply a Gaussian blur to the histograms to form blurred histograms; and
   calculate Euclidean distances between the blurred histograms.

23. The computer program product of claim 21, wherein to calculate the pairwise distances between the plurality of pictures the computer readable program when executed on the computer further causes the computer to:
   determine a first perimeter for a first picture and a second perimeter for a second picture;
   calculate a perimeter difference between the first perimeter and the second perimeter;
   determine a first area for a first picture and a second area for a second picture;
   calculate an area difference between the first area and the second area; and
   combine the perimeter difference and the area difference to form a pairwise distance between the first picture and the second picture.

24. The computer program product of claim 21, wherein arranging the plurality of pictures into one or more groups comprises arranging the plurality of pictures into three groups.

25. The computer program product of claim 21, wherein the group arrangement cost is also based on a picture size similarity.

26. The computer program product of claim 21, wherein the computer readable program when executed on the computer further causes the computer to stretch the collage layout to match a specified collage aspect ratio.

27. The computer program product of claim 26, wherein the specified collage aspect ratio is selected from one of the following aspect ratios: 1:1, 2:1, 4:3, 3:2, 16:9.

28. The computer program product of claim 26, wherein the computer readable program when executed on the computer further causes the computer to automatically determine the specified collage aspect ratio based an output format for the collage.

29. The computer program product of claim 21, wherein the computer readable program when executed on the computer further causes the computer to crop one or more pictures of the plurality of pictures to fit into the collage layout.

30. The computer program product of claim 29, wherein cropping the one or more pictures is based on recognized details in the one or more pictures and further comprises performing detail recognition on the one or more pictures prior to cropping the one or more pictures, the detail recognition including at least one of: tagged details recognition and gradient detail recognition.

* * * * *